United States Patent [19]
Marcus

[11] 3,886,230
[45] May 27, 1975

[54] POLYESTER BLENDS CONTAINING A DI(HYDROXYALKYL) AMINE MODIFIED POLYESTER

[75] Inventor: Erich Marcus, Charleston, W. Va.

[73] Assignee: Union Carbide Corporation, New York, N.Y.

[22] Filed: Nov. 6, 1973

[21] Appl. No.: 413,318

[52] U.S. Cl................................ 260/860; 260/75 N
[51] Int. Cl............................................. C08g 39/02
[58] Field of Search.......... 260/860, 75 N; 8/4, 168, 8/179, DIG. 4

[56] References Cited
UNITED STATES PATENTS

| | | | |
|---|---|---|---|
| 2,647,104 | 7/1953 | Shivers, Jr. ....................... | 260/75 N |
| 2,739,958 | 3/1956 | Lincoln et al...................... | 260/75 N |
| 2,921,828 | 1/1960 | Caldwell ................................. | 8/168 |
| 3,065,207 | 11/1962 | Andres................................. | 260/75 N |
| 3,285,993 | 11/1966 | Inamoto et al....................... | 260/857 |
| 3,551,521 | 12/1970 | Thomas ......................... | 260/45.9 X |
| 3,624,181 | 11/1971 | Munakata........................... | 260/860 |

FOREIGN PATENTS OR APPLICATIONS 990,579   4/1965   United Kingdom

Primary Examiner—Morris Liebman
Assistant Examiner—T. Pertilla
Attorney, Agent, or Firm—Francis M. Fazio

[57] ABSTRACT

Dyeable blends of conventional polyesters with modified polyesters containing a di(hydroxyalkyl) amine polymerized in the molecule.

22 Claims, No Drawings

POLYESTER BLENDS CONTAINING A DI(HYDROXYALKYL) AMINE MODIFIED POLYESTER

BACKGROUND OF THE INVENTION

The synthetic polyesters have become a major factor in the fiber industry. However, many of them suffer from the deficiency that they are difficult to dye to deep shades. Many attempts have been made to overcome this deficiency and the literature is replete with the different techniques that have been used. Among such attempts are the methods shown in U.S. Pat. No. 2,647,104 wherein a preformed polyester is reacted with an amino alcohol to undergo an ester interchange and introduce the amino group into the molecule. In U.S. Pat. No. 2,739,958 the reaction of a diol, dicarboxylic acid and bis(hydroxyalkyl)alkylamine is disclosed. However, this reference states that the alkyl group of the hydroxyalkyl is preferably as short as possible; in fact all of the examples and claims are directed to the hydroxyethyl compounds. U.S. Pat. No. 3,065,207 shows the use of bis(carboxylbenzyl)alkylamines in the production of polyesters. U.S. Pat. No. 3,285,993 relates to blends of polyesters and polyamides in which the polyamides contain an aliphatic tertiary aminodicarboxylic acid to improve dyeability. In U.S. Pat. No. 3,551,521 the use of polyesters obtained by the condensation of dicarboxylic acids and di(hydroxyalkyl)-amines in blends with polyolefins is disclosed. U.S. Pat. No. 3,624,181 discloses the use of 2-(dialkylaminomethyl)-1,3-propanediols to produce modified polyesters that are alleged to be more readily dyeable and British Pat. No. 990,579 discloses that certain N-t-butyldialkanolamines can be used to modify polyesters and render them more readily dyeable.

SUMMARY OF THE INVENTION

It has now been found that certain modified polyesters produced with di(hydroxyalkyl)amines wherein the hydroxyl group in the hydroxyalkyl is at least three carbon atoms removed from the amine nitrogen atom can be used to produce blends with conventional polyesters, which blends are readily dyed to deep shades. The modified polyesters used to improve the dyeability of polyesters are the reaction products of a dicarboxylic acid and the di(hydroxyalkyl)amine or the reaction product of a dicarboxylic acid, a diol and the di(hydroxyalkyl)amine. The di(hydroxyalkyl)amines used to produce the modified polyesters are those having not more than two hydroxyalkyl groups in the molecule and are represented by the general formula

HOR-N-R'
|
R''' in which R is a divalent alkylene having from 3 to about 8 carbon atoms; R' is an —ROH group or —R''; R'' an alkyl or aralkyl group having from 2 to about 8 carbon atoms or a cycloalkyl group having from 5 to 6 ring carbon atoms; and R''' is a —R'' group, an

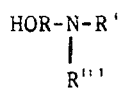

group or an

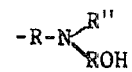

group. Illustrative of suitable compounds are bis(3-hydroxypropyl)ethylamine, bis(3-hydroxypropyl)isopropylamine, bis(3-hydroxypropyl)-t-butylamine, bis(-3-hydroxypropyl)cyclohexylamine, bis(3-hydroxypropyl)benzylamine, bis(4-hydroxybutyl)isobutylamine, bis(6-hydroxyhexyl)isopropylamine, bis(8-hydroxyoctyl)ethylamine, N,N-diethyl-N',N'-bis(3-hydroxypropyl)-1,3-propanediamine, N,N'-diisopropyl-N,N'-bis(3-hydroxypropyl)-1,4-butanediamine, N,N'-diethyl-N,N'-bis(3-hydroxypropyl)-1,3-propanediamine,N,N-diisopropyl-N',N'-bis(6-hydroxyhexyl)-1,6-hexanediamine, etc.

The di(hydroxyalkyl)amines defined by the above generic formula suitable for the production of the modified polyesters are all defined by the following subgeneric formulas:

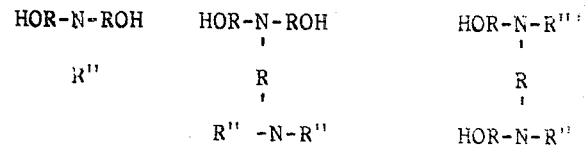

As used in this application, the term "modified polyester" means a polyester containing a di(hydroxyalkyl) amine of formula I polymerized in the molecule.

The di(hydroxyalkyl)-amines used to produce the modified polyesters blended with the conventional polyesters are known compounds and can be manufactured in several ways. Thus, for example, bis(3-hydroxypropyl)ethylamine can be produced by the reduction of bis(2-carbomethoxyethyl)ethylamine with lithium aluminum hydride. Bis(3-hydroxypropyl)isopropylamine can be prepared from 3-chloro-1propanol and isopropylamine using sodium iodide as catalyst and a solvent as shown in Experiment A. Similarly, bis(6-hydroxyhexyl)-isopropylamine can be derived from 6-chloro-1-hexanol and isopropylamine, and N,N-diethyl-N',N'-bis(3-hydroxypropyl)-1,3-propanediamine can be synthesized from N,N-diethyl-1,3-propanediamine and 3-chloro-1-propanol. The addition of amines to allyl alcohol could be employed with advantage; e.g., N,N'-diethyl-N,N'-bis(3-hydroxypropyl)-1,3-propanediamine can be obtained from N,-N'-diethyl-1,3-propanediamine and allyl alcohol in the presence of sodium.

It was unexpected and unobvious to find that the defined di(hydroxyalkyl)amines having at least three carbon atoms between the hydroxyl group and the nitrogen atom are much more stable than similar aminoglycols described in the prior art. It is stated in U.S. Pat. No. 2,739,958 that the alkyl chain joining the hydroxyl group to the nitrogen atom is preferably as short as possible. Data presented in this application clearly shows that bis(2-hydroxyethyl)alkylamines are highly unstable when attempts are made to convert them into polyesters at 280°. Hence, there is little hope that these aminoglycols of the prior art will find commercial application. On the other hand, when the herein defined di(hydroxyalkyl)amines are employed, stable nitrogen-

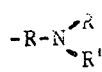

containing modified polyesters can be obtained. The preferred nitrogen-containing modified polyesters are those that are thermally stable at 280° for more than 1 hour. One of the most preferred di(hydroxyalkyl)amines, bis(3-hydroxypropyl)isopropylamine, has been used to produce modified polyesters which are extremely stable and remain light-colored at 280° for more than three hours. Generally, it is found that the products of thermal decomposition of nitrogen-containing polyesters catalyze further degradation. The appearance of a dark color usually coincides with the progression of other undesirable side reaction.

Thermal stability of the di(hydroxyalkyl)amine is of particular importance when an amine-modified poly(ethylene terephthalate) is prepared directly from dimethyl terephthalate, ethylene glycol, and the di(hydroxyalkyl)amine since all of the reactants must be stable during the entire polycondensation period to minimize discoloration and loss of amine by decomposition. Furthermore, any amine decomposition usually makes it difficult to prepare fiber-forming polyesters of high enough molecular weight. A statement in U.S. Pat. No. 3,624,181, column 3, line 13 et seq., indicates that it is difficult to prepare a copolyester with large amounts of certain other amines, such as the 2-(dialkylaminomethyl)-1,3-propanediols, via the direct copolymerization process; indeed, data presented in Example 15 indicates that the copolyesters produced by the direct copolymerization process with this type of amine compounds contain less than the theoretical amount of nitrogen and the specific viscosities reported are relatively low for fibers.

The di(hydroxyalkyl)amines defined above were found to be advantageous in the direct production of modified polyesters useful in the blends of this invention. They are stable at the reaction temperatures required and do not develop an undesirable dark color. They are reacted in the conventional procedures used for the production of polyesters and any of the known processes can be used, such as are shown in U.S. Pat. No. 3,148,434.

Suitable diols for use with the di(hydroxyalkyl)amines in the production of the modified polyesters are the aliphatic diols represented by the general formula

wherein $n$ is an integer of from 2 to 10, such as ethylene glycol, trimethylene glycol, pentamethylene glycol, hexamethylene glycol, decamethylene glycol, and the like. Also suitable are 1,4-cyclohexanedimethanol, p-xylene glycol, hydroquinone diacetate, 4-hydroxybenzyl alcohol, and the like. It is known that any glycol of an aliphatic nature, whether or not it contains aromatic nuclei, can be used in the production of linear polyesters. Thus, the term aliphatic glycols includes all those glycols of an aliphatic nature which are known to the art to be suitable.

The preferred dicarboxylic acid compounds for the production of the modified polyesters useful in this invention are the aromatic dicarboxylic acids, which are well known to those skilled in the art. The most preferred dicarboxylic acid is terephthalic acid and the dialkyl esters thereof, such as dimethyl terephthalate, diethyl terephthalate and similar esters in which the alkyl groups prepferably contain from 1 to about 5 carbon atoms. Other suitable aromatic dicarboxylic acids or their esters which can be used include isophthalic acid, p,p'-diphenylcarboxylic acid, p,p'-dicarboxydiphenyl ethane, p,p'-dicarboxydiphenyl hexane, p,p'-dicarboxydiphenyl sulfide, p,p'-dicarboxydiphenyl sulfone, p,p'-dicarboxydiphenyl ether, p,p'-dicarboxyphenoxybutane, 2,6-dinaphthalene dicarboxylic acid, and the like. Mixtures of two or more dicarboxylic acids can also be used. Up to about 20 percent by weight of the aromatic dicarboxylic acid can be replaced by an aliphatic acid or ester thereof, such as adipic acid, succinic acid, sebacic acid, dimethyl 1,2-eicosanedioate, and the like.

In the polymerization process the calculated amount of each reactant and catalyst is charged to a reactor and heated at a temperature of from about 150°C. to about 270°C., preferably from about 170° to about 250°C. under an inert atmosphere to effect the initial ester interchange reaction. Generally excess diol is used and after the transesterification the excess is removed by heating to about 280°C. at reduced pressure under an inert atmosphere or by passing a stream of of an inert gas through the melt at atmospheric pressure. Thereafter the polycondensation is carried out at from about 225°C. to about 325°C., preferably from about 260°C. to about 290°C., and at reduced pressures of from about 0.1 mm. to about 20 mm. of mercury, preferably from 0.1 mm. to about 5 mm., also under an inert atmosphere. If desired, the entire reaction can be carried out at atmospheric pressure while bubbling a stream of inert gas through the molten mixture; the rate of gas flow being increased as the polycondensation process. The total reaction period can be from about one to twelve hours, varying with the catalyst employed and its concentration, the temperature, the pressure, the starting monomers, the viscosity desired for the modified polyester, and so forth, as is known in the art.

It was observed that the dimethyl esters of the dicarboxylic acid showed some tendency to react with the tertiary di(hydroxyalkyl)amines at the higher temperatures. To avoid this side reaction one can conduct the transesterification at as low a temperature as possible while removing the methanol produced as rapidly as possible. One can also follow the expedient of adding the tertiary di(hydroxyalkyl)amines to the mixture after the completion of the transesterification reaction between the dimethyl ester, e.g., dimethyl terephthalate, and the diol, e.g., ethylene glycol, and then continue with the polycondensation reaction. These precautions, however, are not necessary with the higher esters, but they can be used if one desires to do so.

The concentration of di(hydroxyalkyl)amines in the reaction mixture used to produce the modified polyesters can vary from 0.5 mole to 10 moles, preferably from 1 mole to 6 moles, per mole of total dicarboxylic acids present. When the di(hydroxyalkyl)amine is the sole hydroxyl compound, then one must use at least an amount equivalent to the amount of dicarboxylic acids present.

Any of the well known polyesterification catalysts can be used, such as antimony oxide, germanium dioxide, zinc acetate, manganese acetate, cobaltous acetate, zinc succinate, zinc borate, magnesium methoxide, sodium methoxide, barium oxide, cadmium formate, litharge, dibutyltin oxide, tetraisopropyl titanium silicate, and the like. The concentration of the catalyst can be varied from about 0.001 percent to about 1 percent by weight of the total amount of dicarboxylic acid compounds charged. A preferred amount is from about 0.005 percent to about 0.5 percent by weight; with the most preferred amount being from about 0.01 percent to about 0.2 percent by weight. It is preferred that the titanium base catalyst be used since it is effective at lower concentrations.

The modified polyesters produced will vary from about 0.4 to about 1 in reduced viscosity. The reduced viscosities are determined at 25°C. with a solution of 0.2 grams per 100 ml. of a 1:1 mixture by weight of phenol and tetrachloroethane as the solvent, using the equation $$I_R = \frac{\Delta N}{N_0} \times \frac{1}{C}$$

wherein $\Delta N$ is the difference between the flow time of the solution and the flow time of the solvent, $N_0$ is the flow time of the solvent, and $C$ is the concentration of the polymer in grams per 100 milliliters of solution.

The modified polyesters can be added to the conventional polyester to produce blends of improved dyeability by any convenient method. For example, the dried, powdered polymers can be tumbled together, the polymers can be fusion blended, or the polymers can be solution blended using a suitable solvent. All of these procedures, as well as other techniques, are known to those skilled in the art.

The conventional polyesters, that is those which do not contain the di(hydroxyalkyl)amine of formula I polymerzied in the molecule, are well known commercial products. Any of these known polyesters can be used in producing the blends of this invention and their identities are so well established that a further description thereof is not necessary since those skilled in the art are fully familiar with them.

The amount of modified polyester employed in the blends can vary from 2.5 percent to 25 percent by weight of the blend, preferably it is from about 4 percent to 10 percent of the weight of the blend of polyesters.

The polyester compositions can also contain the conventional additives normally added to such resins, for example, color inhibitors such as the alkyl or aryl phosphite esters; pigments, delusterants or other additive, such as titanium dioxide or barium carbonate; viscosity stabilizers; etc.

Among the suitable acid dyes that can be used with the blends of modified polyester and conventional polyester of this invention, one can mention acid yellow 1 (C.I. 10316), acid yellow 17 (C.I. 18965), acid yellow 40 (C.I. 18950), acid yellow 73 (C.I. 45350), acid orange 7 (C.I. 15510), acid red 37 (C.I. 17045), acid red 114 (C.I. 23635), acid violet 58 (C.I. 16260), acid blue 59 (C.I. 50315), acid blue 104 (C.I. 42735), acid green 16 (C.I. 44025), acid brown 6 (C.I. 14625), acid black 26A (C.I. 27075).

Experiment A

Isopropylamine (11.8 g., 0.2 mole) was added dropwise with stirring during a period of 2 hours to a mixture of 3-chloro-1-propanol (56.7 g., 0.6 mole), sodium iodide (90 g., 0.6 mole), triethylamine (60.7 g., 0.6 mole), and ethanol (200 ml) which had previously been heated to 80°. The reaction mixture was stirred at reflux for another 47 hours and then allowed to cool to room temperature. After removal of 71.5 g. of white solid salt, ethanol was removed under reduced pressure to give 129 g. of residue which was dissolved in 5% aqueous sodium hydroxide solution (350 ml.) Exhaustive extraction with chloroform afforded 28 g. of an oil which was distilled to give 22.4 g. of an oil, b.p. 75°/4 mm.–170°/7.5 mm. A fraction (9.8 g.) rich in bis(3-hydroxypropylisopropylamine), b.p. 165°–170°/7.5mm., was redistilled to give 9.4 g. of product, b.p. 166°–170°/7.5 mm., N = 7.9% (Theory 8.0%). Infrared and nuclear magnetic resonance spectra confirmed the proposed structure.

The following examples serve to illustrative the invention.

EXAMPLE 1

A mixture of diethyl terephthalate (28 g., 0.126 mole), bis(3-hydroxypropyl)isopropylamine (22.1 g., 0.126 mole), and 0.19 ml. of a 1 percent solution of tetraethyl titanate in toluene was heated under nitrogen during a period of 1.1 hours at at temperature of from 200° to 286° C. to remove ethanol. Heating was continued for another 1.5 hours between 280° and 283°C. at 0.1–0.2 mm. to give 38.5g. of a straw-colored viscous poly[isopropyliminobis(trimethylene)terephthalate] having a reduced viscosity of 0.23.

A master batch was prepared by blending 29.3 g. of the above modified polyester with 102 g. of molten poly(ethylene terephthalate) having a reduced viscosity of 0.98 and stirring under nitrogen at 290° to 300° C. for 17 minutes. The blend was cooled and chipped.

A 59.7 g. portion of the master batch was dry blended with 204 g. of the same poly(ethylene terephthalate); the mixture was finely chipped and then dried overnight in a vacuum oven at 125°C. The blend was melt-spun at 290°C. through a 25-hole spinneret having a 0.020 inch hole diameter at a take-up velocity of 450 feet per minute to produce a multifilament yarn having a light yellow-greyish tinge. The fibers had a reduced viscosity of 0.56 and a melting point of 257°–258°C. They were drawn 4.1 fold over a heated shoe at 70° to 75°C. and then over a ceramic pin at 100°C. A portion of the fibers drawn 4.5 fold had a tenacity of 2.6 g./denier, a stiffness modulus of 85 g/denier, an elongation of 18 percent and a denier of 128.

The stretched fiber was knit into a tubing and portions were dyed with Acid Blue 59, Acid Red 114, Acid Black 26A and Acid Yellow 40. The dyeing was carried out for one hour in a boiling solution of 20 ml. of water, 2 ml. of a 2 percent solution of sulfuric acid 2.5 ml. of a one percent solution of the dye, 0.25 ml. of a one percent solution of a nonionic detergent (TERGITOL 15-S-9 registered trade mark) and about 0.1 to 0.2 part of a conventional phenolic dye carrier. The dyed fibers were scoured and dried. In all instances the knit tubings were dyed to deep shades having good light; wash, dry cleaning and crocking fastness properties.

The unmodified poly(ethylene terephthalate) fibers produced in a similar manner were only slightly tinted.

EXAMPLE 2

A mixture of diethyl terephthalate (28 g., 0.126 mole), bis(3-hydroxypropyl)ethylamine (20.3 g., 0.126 mole), and 0.19 ml. of a 1 percent solution of tetraethyl titanate in toluene was heated under nitrogen during a period of 1.1 hours from 215° to 285° to remove ethanol. Heating was continued for another 0.75 hour between 282° and 285° at 0.1 mm. to give 35.9 g. of straw-colored visous poly[ethyliminobis(trimethylene)-terephthalate] having a reduced viscosity of 0.26.

A master batch was prepared by blending 25.8 g. of the above modified polyester with 75 g. of molten poly(ethylene terephthalate) having a reduced viscosity of 0.98 and stirring under nitrogen at 285° to 290°C. for 15 minutes. The pressure was then gradually reduced to 0.7 mm. of mercury over a 5 minutes period at 287° to 290° C. and the blend was then cooled and chipped.

A 48 g. portion of the master batch was dry blended with 204 g. of the same poly(ethylene terephthalate); the mixture was then chipped, dried, spun and drawn as described in Example 1. The spun fibers had a reduced viscosity of 0.52. A portion of the fibers drawn 4.5 fold had a tenacity of 2.9 g./denier, a stiffness modulus of 97 g./denier, an elongation of 25 percent and a denier of 146.

Tubing knit from the drawn fiber and dyed as described in Example 1 showed deep shades with the blue, black, red and yellow dyes.

EXAMPLE 3

A mixture of diethyl terephthalate(14 g., 0.063 mole), diethyl sebacate (16.3 g., 0.063 mole), bis(3-hydroxypropyl)isopropylamine (22.1 g., 0.126 mole), and 0.19 ml. of 1 percent solution of tetraethyl titanate in toluene was heated under nitrogen during a period of 1.1 hour at from 190° to 284° to remove ethanol. Heating was continued for another hour between 283° and 284° at 0.1 mm. to give 41.1 g. of straw-colored poly[isopropyliminobis(trimethylene)terephthalatesebacate] having a reduced viscosity of 0.50.

A master batch was prepaid by blending 27.8 g. of the above modified polyester with 75 g. of molten poly(ethylene terephthalate) having a reduced viscosity of 0.98 and stirring under nitrogen at 275° to 293°C. for 18 minutes. The pressure was then gradually reduced to 0.3 mm. of mercury over a 5 minutes period at 290°C. and the blend was then cooled and chipped.

A 50 g. portion of the master batch was dry blended with 204 g. of the same poly(ethylene terephthalate); the mixture was then chipped, dried, spun and drawn as described in Example 1. The spun fibers had a reduced viscosity of 0.50. A portion of the fibers drawn 4.5 fold had a tenacity of 2.5 g./denier, a stiffness modulus of 85 g./denier, an elongation of 12 percent and a denier of 141.

Tubing knit from the drawn fiber and dyed as described in Example 1 showed deep shades with the blue, black, red and yellow dyes.

EXAMPLE 4

A mixture of diethyl terephthalate (1.6 g., 0.0072 mole), bis(3-hydroxypropyl)isopropylamine (1.10 g., 0.0063 mole), and 0.014 ml. of a 1 percent solution of tetraethyl titanate in toluene was heated under nitrogen during a period of 1.2 hours at from 240°C. to 280°C. to remove ethanol. Heating was continued for another hour between 275° and 278° C. at 0.1 mm. to give 2.1 g. of straw-colored viscous poly[isopropyliminobis(trimethylene)terephthalate] having a reduced viscosity of 0.17. The polymer was in excellent agreement with the postulated structure when examined by nuclear magnetic resonance procedures.

A 0.18 g. portion of the above modified polyester was blended with 3 g. of poly(ethylene terephthalate) having a reduced viscosity of 0.82 and a melting point of 262° to 263° C. by stirring under nitrogen at 270° C to 280°C. for 10 minutes. The ivory colored blend had a reduced viscosity of 0.57 and a melting point of 255°C to 258°C. It is readily spinnable to produce fibers.

EXAMPLE 5

A mixture of diethyl sebacate (1.6 g., 0.062 mole), bis(3-hydroxypropyl)isopropylamine (1.1 g., 0.063 mole), and 0.014 ml. of a 1 percent solution of tetraethyl titanate in toluene was heated for 1.8 hours at from 215° to 273°C. under nitrogen to remove ethanol. Heating was continued for another hour between 273° and 282°C. at 0.1 mm. to give 2.3 g. of a straw-colored very viscous poly[isopropyliminobis(trimethylene)sebacate] having a reduced viscosity of 0.48. The nmr spectrum was in excellent agreement with the postulated structure.

A 0.28 g. portion of the above modified polyester was blended with 4 g. of the same poly(ethylene terephthalate) used in Example 4 by the same procedure but stirring at 280° to 285°C. for 15 minutes. The ivory colored blend had a reduced viscosity of 0.74 and a melting point of 249° to 250°C.

A 0.5 g. portion of shavings obtained with a ⅛-inch drill bit was scoured, washed with water, dried, and dyed as described in Example 1. Deep shades were obtained and the dye uptake with the blue was about 53 percent after scouring and 46 percent with the red. In contrast, the unmodified poly(ethylene terephthalate) was dyed to a very pale blue and the red afforded a pale pinkish yellow shade.

EXAMPLE 6

A mixture of diethyl sebacate (1.6 g. 0.062 mole), bis(3-hydroxypropyl)isopropylamine (1.16 g., 0.066 mole), and 0.014 ml. of a 1 percent solution of tetraethyl titanate in toluene was heated under nitrogen during a period of 1.3 hours at from 220° to 280°C. to remove ethanol. Heating was continued for another 0.7 hours between 275° and 280°C. at atmospheric pressure and for another 3.3 hours between 275° and 280°C. at 0.2 to 0.1 mm. to give 2.3 g. of straw-colored viscous poly[isopropyliminobis(trimethylene)sebacate] having a reduced viscosity of 0.64. The nmr spectrum was in excellent agreement with the postulated structure and showed the presence of a minor amount of aminoalcohol end groups.

The above modified polyester was blended with poly(ethylene terephthalate) as described in Example 5 and shavings were obtained and dyed as described in Example 1 with the blue and black dyes. Deep shades were obtained with both dyes; the dye uptake was about 65 percent in both instances.

EXAMPLE 7

A mixture of diethyl terephthalate (1.2 g., 0.0054 mole), bis(3-hydroxypropyl)isopropylamine (1.1g., 0.0063 mole), and 0.014 ml. of a 1 percent solution of tetraethyl titanate in toluene was heated under nitrogen during a period of 1.8 hours at from 230° to 274°C to remove ethanol. Heating was continued for another 3 hours between 275° and 281°C. at 0.1 mm. to give 1.9 g. of straw-colored viscous poly[isopropyliminobis(trimethylene terephthalate] having a reduced viscosity of 0.44. The nmr and infrared spectra were in excellent agreement with the postulated structure and they showed only a minor amount of ester end groups.

The above modified polyester was blended with poly(ethylene terephthalate) as described in Example 5 and shavings were obtained and dyed as described in Example 1 with the blue and black dyes. Deep shades were obtained with both dyes; the dye uptake was about 43 percent in both instances.

EXAMPLE 8

A mixture of diethyl terephthalate (4.4 g. 0.02 mole), bis(3-hydroxypropyl)isopropylamine (0.16 g., 0.00091 mole), ethylene glycol (3.12 g., 0.05 mole), and 0.04 ml. of a 1 percent solution of tetraethyl titanate in toluene was heated under nitrogen during a period of 2.2 hours at from 180° to 275°C. to remove ethanol. Heating was continued for another hour between 275° and 280°C. at 0.1–0.2 mm. to give 4.1 g. of the light yellow terpolymer poly[isopropyliminobis(trimethylene)ethylene terephthalate] having a reduced viscosity of 0.71 and a melting point of 255° to 256°C.

The above modified polyester was blended with poly(ethylene terephthalate) as described in Example 5 and shavings were obtained and dyed as described in Example 1 with the black and yellow dyes. Deep shades were obtained with both dyes; the dye uptake in both instances was about 52 percent.

EXAMPLE 9

A mixture of diethyl terephthalate (1.3 g., 0.0058 mole), bis(3-hydroxypropyl)ethylamine (1.1 g., 0.0068 mole), and 0.011 ml. of a 1 percent solution of tetraethyl titanate in toluene was heated under nitrogen during a period of 1.8 hours at from 230° to 273°C. to remove ethanol. Heating was continued for another hour between 273° and 283°C. at 0.1 mm. to give 2 g. of straw-colored viscous poly[ethyliminobis(trimethylene)terephthalate] having a reduced viscosity of 0.43. The nmr spectrum indicated that minor amounts of ester and alcohol end groups were present.

A 0.34 g. portion of the above modified polyester was blended with 6 g. of poly(ethylene terephthalate) having a reduced viscosity of 0.82 as described in Example 5. The ivory colored blend had a reduced viscosity of 0.51 and a melting point of 252° to 253°C. This blend readily dyes to deep shades with acid dyes.

EXAMPLE 10

A mixture of diethyl succinate (1.2 g.; 0.0069 mole), bis(3-hydroxypropyl)isopropylamine (1.1 g., 0.0063 mole), and 0.014 ml. of a 1 percent solution of tetraethyl titanate in toluene was heated under nitrogen during a period of 2.2 hours at from 233° to 274°C. to remove ethanol. Heating was continued for another hour between 274° and 284°C. at 0.1–0.2 mm. to give 1.8 g. of straw-colored viscous poly[isopropyliminobis(trimethylene)succinate] having a reduced viscosity of 0.32.

A 0.15 g. portion of the above modified polyester was blended with 3 g. of poly(ethylene terephthalate) as described in Example 5. The light yellow blend had a reduced viscosity of 0.64 and a melting point of 259° to 260°C. This blend readily dyes to deep shades with acid dyes.

EXAMPLE 11

A mixture of N,N'-diethyl-N,N'-bis(3-hydroxypropyl)-1,3-propanediamine (1.36 g., 0.0055 mole), diethyl terephthalate (1.2 g., 0.0055 mole) and 0.011 ml. of a 1 percent solution of tetraethyl titanate in toluene was heated under nitrogen during a period of 1.6 hours at from 225° to 280°C. to remove ethanol. Heating was continued for another hour between 275° and 276°C. at 0.05 to 0.1 mm. to give 2.1 g. of light yellow poly{[trimethylene-N,N'-bis(ethylimino)]-N,N'bis-(trimethylene) terephthalate}. Blends of this modified polyester with poly(ethylene terephthalate) are readily dyed.

EXAMPLE 12

A mixture of diethyl terephthalate (1.2 g., 0.0055 mole), N,N-diethyl-N',N'-bis(3-hydroxypropyl)-1,3-propanediamine (1.36 g., 0.0055 mole), and 0.011 ml. of a 1 percent solution of tetraethyl titanate in toluene was heated under nitrogen during a period of 1.6 hours at from 225° to 280°C. to remove ethanol. Heating was continued for another hour between 275° and 280°C. at 0.1 mm. to give 2.0g. of light yellow poly[N,N-(diethylamino)propyliminobis-N',N'-trimethylene terephthalate]. Blends with conventional polyesters are readily dyed to deep shades with acid dyes.

For comparative purposes, several attempts were made to produce polyesters using modifiers disclosed in the prior art referred to previously. In all instances, dark colored unsuitable products were obtained that would have no commercial value.

COMPARATIVE I

A mixture of diethyl terephtahalate (1.2 g., 0.0054 mole), t-butyldiethanolamine (1.01 g., 0.0063 mole), and 0.011 ml. of a 1 percent solution of tetraethyl titanate in toluene was heated under nitrogen during a period of 1.5 hours at from 225° to 277°C. to remove ethanol. Heating was continued for another hour between 275° and 282°C. at 0.1 mm. to give 1.3 g. of a black solid residue. The t-butyldiethanolamine modifier used has only two carbon atoms separating the hydroxyl group from the amine nitrogen atom.

COMPARATIVE II

A mixture of diethyl terephthalate (0.8 g., 0.0036 mole), 2,2-bis(diethylaminomethyl)-1,3-propanediol (1.05 g., 0.0043 mole), and 0.008 ml. of a 1 percent solution of tetraethyl titanate in toluene was heated under nitrogen during a period of 1.6 hours at from 225° to 278°C. to remove ethanol. Heating was continued for another hour between 270° and 273°C. at 0.05 to 0.1 mm. to give 1.0g. of a very dark brown solid residue. The amine modifier used in this instance is a diamine derivative of pentaerythritol.

COMPARATIVE III

A mixture of diethyl terephthalate (1.20 g., 0.0055 mole), bis(3-hydroxypropyl)methylamine (0.92 g., 0.0062 mole), and 0.011 ml. of a 1 percent solution of tetraethyl titanate in toluene was heated under nitrogen during a period of 1.7 hours at from 210° to 278°C. to remove ethanol. Heating was continued for another 3 hours between 275° and 280°C. at 0.05 mm. to give 1.3 g. of black solid residue. In this instance the alkyl substituent on the amine nitrogen atom contains but one carbon atoms.

COMPARATIVE IV

A mixture of diethyl terephthalate (1.2 g., 0.0055 mole), N,N'-diethyl-N,N'-bis(3-hydroxypropyl)-1,2-ethylenediamine (1.28 g. 0.0055 mole), and 0.011 ml.

of a 1 percent solution of tetraethyl titanate in toluene was heated under nitrogen during a period of 1.4 hours at from 235° to 275°C. to remove ethanol. Heating was continued for another hour between 270° and 278°C. at 0.1 mm. to give 1.2 g. of a very dark brown viscous residue. Substantial loss of weight during polycondensation, dark color, as well as a very broad infrared spectrum, which also showed an intense amide band, were indicative of significant degradation. The amine modifier used in this run has the two amine nitrogen atoms separated from each other by only two carbon atoms.

COMPARATIVE V

A mixture of diethyl terephthalate (1.5 g., 0.0068 mole), N-methyldiethanolamine (0.8 g., 0.0067 mole), and 0.011 ml. of a 1 percent solution of tetraethyl titanate in toluene was heated under nitrogen during a period of 1.1 hour at from 225° to 282°C. to remove ethanol. Heating was continued for another 0.7 hour between 282° and 286°C. at 0.05 mm. to give 1.2 g. of a black solid residue. The amine modifier used in this run has the hydroxyl group separated from the amine nitrogen atom by two carbon atoms.

COMPARATIVE VI

A mixture of diethyl terephthalate (1.5 g., 0.0068 mole), N-ethyldiethanolamine (0.9 g., 0.0068 mole), and 0.011 ml. of a 1 percent solution of tetraethyl titanate in toluene was heated under nitrogen during a period of 1.1 hours at from 225° to 277°C. to remove ethanol. Heating was continued for another hour between 277° and 281° C. at 0.05 mm. to give 1.8 g. of a dark brown viscous residue. The dark color and an intense amide band in the infrared spectrum were indicative of serious degradation. Again, the amine modifier used was one in which the hydroxyl group is only two carbon atoms removed from the amine nitrogen atom.

What is claimed is:

1. A polyester blend of a uniform mixture of:
   A. from 2.5 to 25 weight percent of modified polyester and
   B. from 75 to 97.5 weight percent of fiber-forming conventional polyester of a diol and a dicarboxylic acid; said modified polyester being the condensation product of:
      a. a dicarboxylic acid or alkyl ester thereof, and
      b. a di(hydroxyalkyl)amine having at least three carbon atoms between the hydroxyl group and the nitrogen atom of the formula:

HOR-N-R'
   |
   R''' wherein R is a divalent alkylene of from 3 to 8 carbon atoms; R' is an —ROH group or R''; R'' is an alkyl or aralkyl group having from 2 to 8 carbon atoms or a cycloalkyl group having 5 or 6 ring carbon atoms; and R''' is R'', an

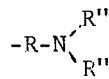

group or an

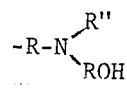

group.

2. A blend as claimed in claim 1 wherein (A) is present at from 4 to 10 weight percent and B is present at from 90 to 96 weight percent.
3. A blend as claimed in claim 1 wherein an aliphatic glycol of from 2 to 10 carbon atoms is an additional reactant for said modified polyester.
4. A blend as claimed in claim 2 wherein an aliphatic glycol of from 2 to 10 carbon atoms is an additional reactant for said modified polyester.
5. A blend as claimed in claim 3 wherein said aliphatic glycol is ethylene glycol.
6. A blend as claimed in claim 1 wherein said conventional polyester (B) is poly(ethylene terephthalate).
7. A blend as claimed in claim 1 wherein said modified polyester (A) is poly[isopropyliminobis(trimethylene) terephthalate].
8. A blend as claimed in claim 1 wherein said modified polyester (A) is poly[ethyliminobis(trimethylene) terephthalate].
9. A blend as claimed in claim 1 wherein said modified polyester (A) is poly[isopropyliminobis(trimethylene) terephthalate-sebacate].
10. A blend as claimed in claim 1 wherein said modified polyester (A) is poly[isopropyliminobis(trimethylene) sebacate].
11. A blend as claimed in claim 1 wherein said modified polyester (A) is poly[isopropyliminobis(trimethylene) succinate].
12. A blend as claimed in claim 1 wherein said modified polyester (A) is poly{[trimethylene-N,N'-bis (ethylimino)]-N,N'-bis(trimethylene) terephthalate}.
13. A blend as claimed in claim 1 wherein said modified polyester (A) is poly[N,N-(diethylamino)-propyliminobis-N',N'-trimethylene terephthalate].
14. A blend as claimed in claim 3 wherein said modified polyester (A) is poly[isopropyliminobis(trimethylene)-ethylene terephthalate] terpolymer.
15. A blend as claimed in claim 7 wherein said conventional polyester (B) is poly(ethylene terephthalate).
16. A blend as claimed in claim 8 wherein said conventional polyester (B) is poly(ethylene terephthalate).
17. A blend as claimed in claim 9 wherein said conventional polyester (B) is poly(ethylene terephthalate).
18. A blend as claimed in claim 10 wherein said conventional polyester (B) is poly(ethylene terephthalate).
19. A blend as claimed in claim 11 wherein said conventional polyester (B) is poly(ethylene terephthalate).
20. A blend as claimed in claim 12 wherein said conventional polyester (B) is poly(ethylene terephthalate).
21. A blend as claimed in claim 13 wherein said conventional polyester (B) is poly(ethylene terephthalate).
22. A blend as claimed in claim 14 wherein said conventional polyester (B) is poly(ethylene terephthalate).

* * * * *